United States Patent [19]

Schmoock et al.

[11] 3,839,912
[45] Oct. 8, 1974

[54] METERING ELECTRODE ASSEMBLY FOR ELECTROMAGNETIC FLOWMETERS

[75] Inventors: Roy F. Schmoock, Richboro; Elmer D. Mannherz, Southampton, both of Pa.

[73] Assignee: Fisher & Porter Co., Warminster, Pa.

[22] Filed: Jan. 18, 1973

[21] Appl. No.: 324,772

[52] U.S. Cl. .......................................... 73/194 EM
[51] Int. Cl. ................................................. G01f 1/00
[58] Field of Search ................................ 73/194 EM

[56] References Cited
UNITED STATES PATENTS

| | | | |
|---|---|---|---|
| 3,263,500 | 8/1966 | Krishnaswamy et al. | 73/194 EM |
| 3,274,831 | 9/1966 | Cushing | 73/194 EM |
| 3,329,020 | 7/1967 | Cushing | 73/194 EM |
| 3,715,918 | 2/1973 | Bailey | 73/194 EM |

*Primary Examiner*—Charles A. Ruehl

[57] ABSTRACT

An electromagnetic flowmeter for measuring fluid flow rates, the meter including a pair of electrode assemblies disposed at diametrically opposed positions in a flow tube through which the fluid to be measured is conducted. Each assembly comprises a probe section formed of dielectric material and an amplifying section integral therewith. The probe section is inserted into the wall of the flow tube, the dielectric face thereof lying flush with the interior tube surface. The amplifying section projects from the flow tube, with the front thereof lying against the outer surface of the tube. Embedded in the probe section is a metal electrode in parallel relation to the face thereof to define a capacitance whose other electrode is the fluid being measured. An amplifying system connected to the metal electrode is embedded in the amplifier section. An alternating magnetic field is established across the flow tube, and the flow of fluid therethrough induces an A-C voltage in the metering electrodes capacitatively coupled to the fluid, which voltage is amplified by the system to provide an output substantially proportional to flow rate.

12 Claims, 6 Drawing Figures

METERING ELECTRODE ASSEMBLY FOR ELECTROMAGNETIC FLOWMETERS

BACKGROUND OF THE INVENTION

This invention relates generally to electromagnetic flowmeters, and more particularly to an electrode assembly for such meters in which the electrode is electrically and physically insulated from the fluid being measured, but is capacitively coupled thereto.

A magnetic flowmeter is adapted to measure volumetric flow rates of fluids which present difficult handling problems, such as corrosive acids, sewage, slurries, and detergents. In a magnetic flowmeter, an electromagnetic field is established across the flow tube, which field is mutually perpendicular to the longitudinal axis of the tube and to the common axis of the meter electrodes.

Since the velocity of the fluid is directed along the longitudinal axis of the flow tube, the voltage induced within the fluid is perpendicular both to the velocity of the fluid and the flux linkages of the magnetic field. The instantaneous voltage developed across the meter electrodes represents an average fluid velocity of the flow profile passing the electrodes at a given moment and the flowmeter will therefore produce an output signal equal to a continuous average flow rate.

For proper operation of a magnetic flowmeter wherein the electrodes make direct contact with the fluid, the electrical conductivity of the path extending between the electrodes must be relatively high. The over-all resistance of this path is determined by that of the fluid itself in series with the interface resistance between the fluid and the active surface of the electrodes.

When meters are used to measure polluted fluids, such as fluids containing oils or sludge, as is often the case in many sewage systems, the oils or other contaminants tend to coat and adhere to the active surface of the electrodes. Since such coatings are insulating in character, as the coatings build up, the resultant interface resistance becomes very high and the electrical conductivity of the path between the electrodes is substantially diminished.

It is well known that when the resistance of the fluidic path rises beyond a predetermined value, the resultant voltage drop and attenuation of the output signal has an adverse effect on the meter accuracy. It has heretofore been necessary to remove such contaminated meters from the flow stream in order to clean the electrode surfaces. This, of course, requires that the pipe line be disassembled, thereby temporarily shutting down the process. In order to avoid the need to shut down the process, it is also known to provide ultrasonic cleaning devices in conjunction with the direct-contact electrodes.

Whether the direct-contact metering electrode requires periodic cleaning or is ultrasonically self-cleaned, a magnetic flowmeter which employs such electrodes has a poor response to fluids having very low electrical conductivity, such as gasoline. Moreover, the metallic interface between the fluid and the electrode results in a direct electrical connection between an explosive fluid such as gasoline and the electrodes, and represents a hazard because of galvanic potentials established across the electrodes and the possibility of sparking. In some instances where the liquid being measured by the meter is non-explosive in character, there may nevertheless be a danger of explosion with direct-contact electrodes when, for example, the liquid is drained from the tube and is temporarily replaced by an explosive gas, such as methane. This type of experience is sometimes encountered in sewage treatment systems.

Also in those situations where magnetic flowmeters are used to measure fluids which are in food or pharmaceutical form, and which dictate stringent sanitary conditions, the presence of direct-contact metering electrodes in the flow path represents a possible source of contamination to the fluid.

SUMMARY OF THE INVENTION

In view of the foregoing, the main object of this invention is to provide metering electrodes for electromagnetic flowmeters, which electrodes are electrically insulated and physically isolated from the fluid being measured — the meter nevertheless, because of capacitive coupling between the fluid and the electrodes, producing an electrical output which is an accurate function of flow rate.

More specifically, it is an object of this invention to provide a metering electrode assembly which incorporates an electrode electrically and physically insulated from the fluid being measured, as well as an amplifying system, the electrode and the amplifying system being electrostatically shielded to prevent stray pickup.

Among the significant advantages and features of the invention are the following:

A. The magnetic flowmeter is adapted to measure fluids of low as well as relatively high conductivity.

B. The magnetic flowmeter provides an accurate response even when used in conjunction with polluting fluids which coat and adhere to the insulating face of the electrode assembly.

C. The magnetic flowmeter is non-contaminating, and may be used with fluids which require the maintenance of stringent sanitary conditions.

D. The magnetic flowmeter eliminates galvanic potentials across the electrodes, and is free of electrical hazards.

E. The electrode assembly which includes an amplifier system, is self-sufficient and produces a signal which may be effectively transmitted to a remote station.

Yet another object of the invention is to provide in an electrode assembly of the above type, a highly compact amplifying system constituted by two field-effect transistors and an integrated-circuit amplifier, the input impedance of the system being extremely high as compared to the impedance presented by the capacitive coupling between the metering electrode and the fluid, whereby variations in the coupling impedance as a result of contaminant coatings have no appreciable effect on the accuracy of the meter.

Briefly stated, these objects are attained in an electromagnetic flowmeter whose flow tube is provided with a pair of oppositely-positioned electrode assemblies, each of which includes a probe section formed mainly of dielectric material and an amplifying section integral therewith.

The probe section is insertable into the wall of the flow tube, the face of the probe lying flush with the interior surface of the tube, thereby avoiding any insertion loss. The amplifying section of the assembly projects from the flow tube, the front of this section lying against the outer surface of the tube.

Embedded in the probe section is a metal metering electrode which lies in parallel relation to the dielectric face of the section to define a capacitance whose other electrode is the fluid being measured. Where the flow tube is provided with an insulating liner, the portion thereof in engagement with the electrode constitutes the dielectric of the capacitance. An amplifying system is disposed in the amplifying section and connected to the metering electrode. An alternating magnetic field is established across the flow tube, and the flow of fluid therethrough induces an A-C voltage in the metering electrodes capacitively coupled to the fluid, which voltage is amplified by the system to provide a meter output.

Because the input impedance of the amplifying system is extremely high and the metering voltage is fed through the relatively low impedance presented by the electrode capacitance in series with the input impedance, the amplitude of voltage yielded at the junction of these two impedances, which together constitute a voltage divider, is substantially proportional to flow rate, regardless of variations in the value of said low impedance as a result of insulating coatings formed on the face of the probe.

OUTLINE OF THE DRAWINGS

For a better understanding of the invention, as well as other objects and further features thereof, reference is made to the following detailed description to be read in conjunction with the accompanying drawings, wherein:

FIG. 3 is a schematic circuit diagram of an electrode assembly;

DESCRIPTION OF THE INVENTION

Figure 1:
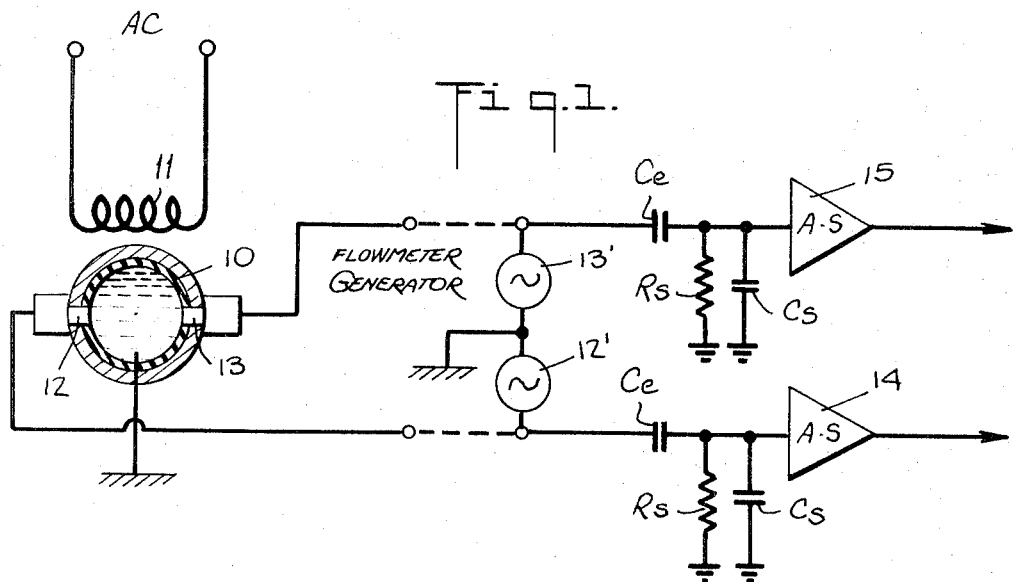
FIG. 1 is a schematic diagram of an electromagnetic flowmeter which incorporates a pair of metering electrode assemblies in accordance with the invention, and the equivalent electrical circuit therefor.

The present invention is applicable to all existing forms of electromagnetic flowmeters which include a flow tube 10, as shown in FIG. 1, and which may be lined or unlined. In the instance where the tube is unlined, the tube is preferably made of insulating material. Established across flow tube 10 is an alternating or periodically-interrupted electromagnetic field which is produced by an electromagnet whose field coil 11 is connected to an alternating-current power line (i.e., 60 Hz) or to a source of periodically-interrupted D-C current.

In the present invention, in lieu of direct-contact electrodes disposed at diametrically-opposed positions on the flow tube, a pair of insulated electrode assemblies 12 and 13 is provided. In the conventional flowmeter arrangement, the flow of fluid in tube 10 intersects the magnetic field that extends at right angles both to the axis of the tube and to the common axis of the electrodes, and induces an A-C voltage across the metering electrodes that is a function of flow rate.

In the present invention, the metering electrodes, as will be later explained in greater detail, are electrically and physically insulated from the fluid, but are capacitively coupled thereto. Inasmuch as the induced voltage is A-C, the capacitive coupling affords an effective connection whose impedance is determined by the capacitive value of the coupling. This capacitive coupling is represented in FIG. 1 by value $C_e$.

Because the fluid is at ground potential, the signal developed across electrode assemblies 12 and 13 may be represented by A-C generators 12' and 13', each of which yields one-half the signal output. Electrode assembly 12 is connected through coupling capacitor $C_e$ to an amplifying system, generally designated by numeral 14, and electrode assembly 13 is likewise connected to an amplifying system 15.

As pointed out previously, the voltage generated by the meter is coupled to the input of an amplifying system through a capacitance $C_e$ formed by the meter electrode as well as the electrode defined by the fluid and a dielectric therebetween. Assuming that this disclosure is thin and has a dielectric constant which is high to produce a relatively large capacitor (in the picofarad range), and further assuming that the input impedance of each amplifier, as represented by capacitor $C_s$ and resistor $R_s$ thereacross, is extremely high, then the impedance presented by the coupling capacitor $C_e$ will be very low relative to the input impedance of the amplifying system.

If, therefore, the value of capacitance $C_e$ is at least one hundred times that of capacitance $C_s$, the loading error will be less than one percent and the meter will be accurate to one percent. The value of resistance $R_s$ is greater than $10^{12}$ ohms, and hence can be ignored, for at the usual frequency of the signal (60 Hz), capacitance $C_s$ will predominate. If, for example, the value of $C_s = 0.02$ pfd, then at 60 Hz, it will have an impedance of $0.136 \times 10^{12}$ ohms, and it will predominate in the parallel combination.

We have assumed that where the value of $C_s = 0.02$ pfd, the value of $C_e$ is 2 pfd, which is 100 times greater, in which event the percentage of error is one per-cent. It will be readily recognized that the larger the value of $C_e$, the less the loading error.

Figure 2:
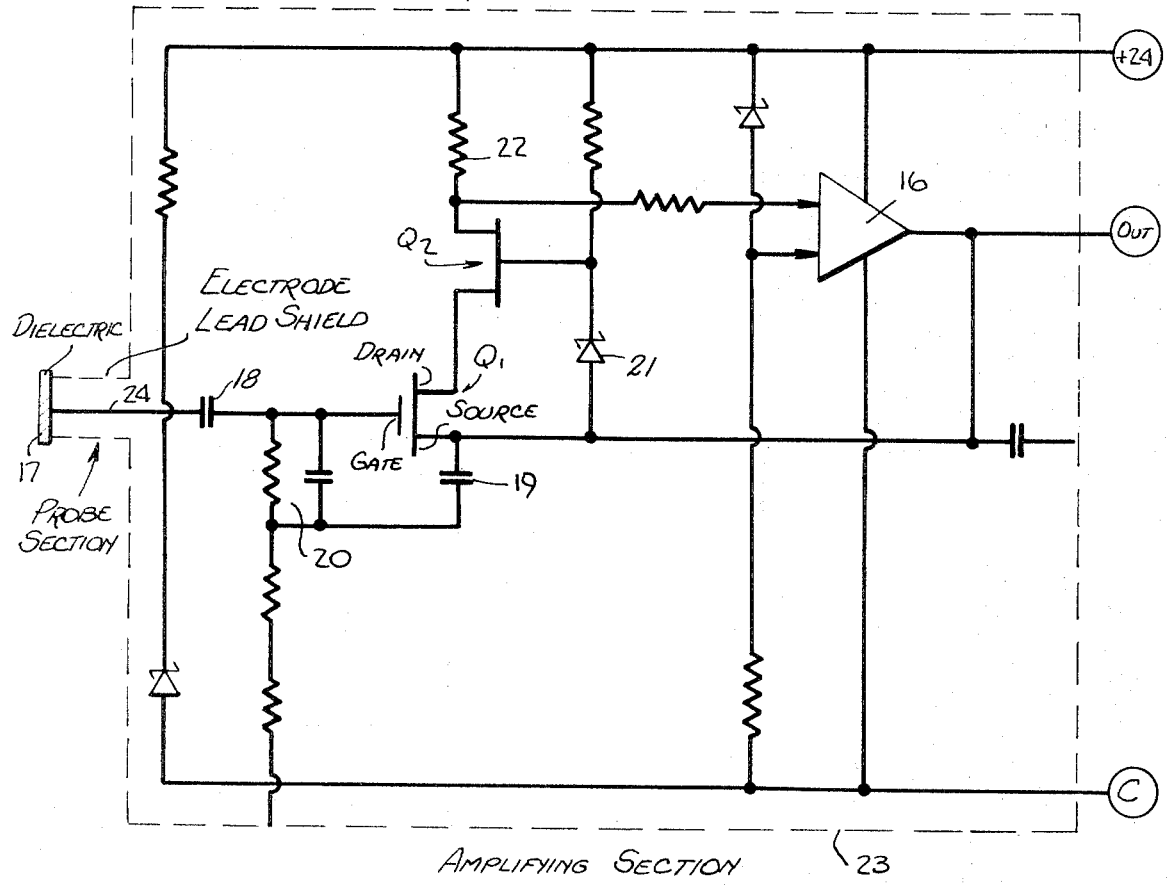
FIG. 2 is a circuit explanatory of the operation of an electrode assembly.
Figure 2:
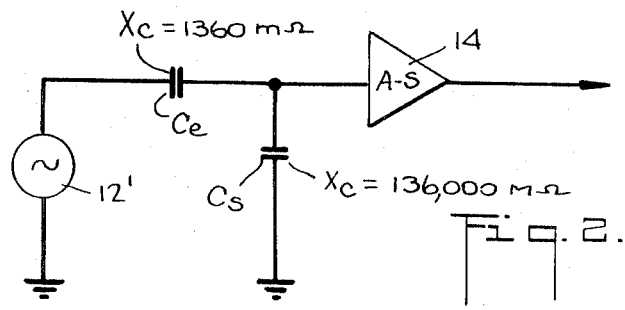

A still simpler explanation of why the value of $C_e$ coupling capacitance may vary within certain limits without adversely affecting the accuracy of the system, will now be given in connection with FIG. 2. It will be seen that coupling capacitance $C_e$ is in series with input capacitance $C_s$, and that the signal voltage from generator 12' is applied across the series-circuit which acts as a voltage divider network formed by the impedance of the capacitance. The voltage applied to the input of amplifying system 14 is taken from the tap T in the divider network, which is the junction of the two impedances $C_e$ and $C_s$.

If, therefore, the impedance of capacitance $C_s$ is extremely high, say 136,000 megohms, and that of capacitance $C_e$ is relatively low, say 1,360 megohms, then even though the impedance of $C_e$ is in the megohm range, its value is negligible in comparison with that of $C_s$. Thus the voltage established at tap T is almost entirely determined by the voltage drop across capacitance $C_s$, and is effectively independent of the voltage drop across $C_e$.

In those metering situations wherein it has heretofore been necessary to ultrasonically clean the electrodes because of contaminants in the fluid which form insulating coatings on the electrodes, when insulating electrode assemblies are used rather than direct-contact electrodes, the insulating face of each electrode assembly will become coated in the course of operation. As a consequence, the coupling capacitance will gradually decrease, for interposed between the metering electrode and the electrode defined by the fluid, is not only the dielectric layer included in the assembly but also the insulation layer introduced by the contaminating coating. If, however, the coupling capacity is initially greater than two picofarads (in the absence of the coating), no gross error will be encountered as the coating builds up on the face of the assembly, until the coupling capacity falls below the two-picofarad value.

Since in most practical situations a state of equilibruim is reached in the coating process, the magnetic flowmeter will continue to function properly, for then at the point of equilibrium, the value of the coupling capacitor will still be at least two picofarads or whatever other value presents an acceptable limit with respect to the input impedance of the amplifying system. On the other hand, if the coating process results in the continuous build-up of coating material to create a layer of increasing thickness then ultimately the amplifier will fail to function, and it will be necessary to clean the face of the assembly. But this situation will rarely occur.

In practice, using a metering electrode having a diameter of one-fourth of an inch and a dielectric layer whose thickness is 0.015 inches, with a dielectric constant $e_R=4$, then since $$C = 0.225\ e_r A_r/t$$

the resultant value of coupling capacitance is 3.6 pfd. Obviously with different parameters, other capacitance values can be obtained to meet specific requirements.

In the amplifying system whose diagram is shown in FIG. 3, use is made of field-effect transistors $Q_1$ and $Q_2$ and an amplifier 16 preferably in integrated circuit of microelectronic form. There are two general types of such transistors, namely junction FET's, and metal-oxide (MOS) transistors. The input impedance of FET's is high because of the reverse-biased diode in the gate-to-channel junction. Compared with the junction FET's, the MOS transistor has a higher input impedance ($>10^{10}$ megohms).

In the probe section of the metering electrode assembly, the electrode 17 lies against the back-side of a thin dielectric layer whose exposed face is engaged by the fluid being measured. Electrode 17 is connected to the gate of field-effect transistor $Q_1$ through a capacitor 18. The field-effect transistors $Q_1$ and $Q_2$ as well as the circuits associated with these transistors and the integrated-circuit amplifier 16, are all embedded or potted in the amplifying section of the assembly. The structures of the probe and amplifier will be described in greater detail in connection with FIGS. 4 and 5.

In order to achieve a low-input capacitance value for $C_s$, and a high resistance value for resistance $R_s$, bootstrapping techniques are used. That is to say, when all three elements of the input FET-$Q_1$ are driven at precisely the input voltage, no voltage difference exists between any of the elements; hence each physical capacitance has zero volts differential across its plates, and therefore zero current flow therethrough. This then effectively reduces the capacitance to zero.

But since the circuit is not perfect and has finite rather than infinite gain, the total effective input capacitance is, in practice, reduced to 0.02 pfd. not zero. Also, the input resistance is greater than $10^{12}$ ohms.

In the circuit shown in FIG. 3, the output of amplifier 16 is fed back directly to the source of transistor $Q_1$, and also through capacitor 19, to one end of the resistancecapacitor parallel network 20, whose other end is connected to the gate of transistor $Q_1$. At the same time, the feedback from amplifier 16 is indirectly fed back to the drain of transistor $Q_1$ via the bootstrapping transistor $Q_2$ through Zener diode 21, which has a level shifting function.

The positive voltage for the bootstrapping transistor $Q_2$ is supplied thereto through a load resistor 22, and the signal developed thereacross is applied to one input of amplifier 16, which is a differential amplifier ($A_1$).

Some minute signal current must flow in the drain circuit of transistor $Q_1$ in order to develop the input signal voltage for amplifier 16. This signal voltage, which is established across resistor 22, whose value is $R_2$, will be as follows:

$$E_{R_2} = E\ \text{flow}/A_1,\ \text{and}$$

$$IR_2\ \text{will equal}\ E\ \text{flow}/A_1 R_2,$$

since the input resistance of $A_1$ is sufficiently high and can therefore be disregarded.

The output of amplifier 16 is also connected to a shield 23 which surrounds the entire amplifying system contained within the amplifying section, as well as the lead 24 in the probe section which connects the metering electrode 17 to the amplifying system. The shield is driven in this manner in order to provide static shielding equivalent to grounding, without, however, being concerned with any stray capacitance that may exist between the housing and the input amplifier.

Figure 4:
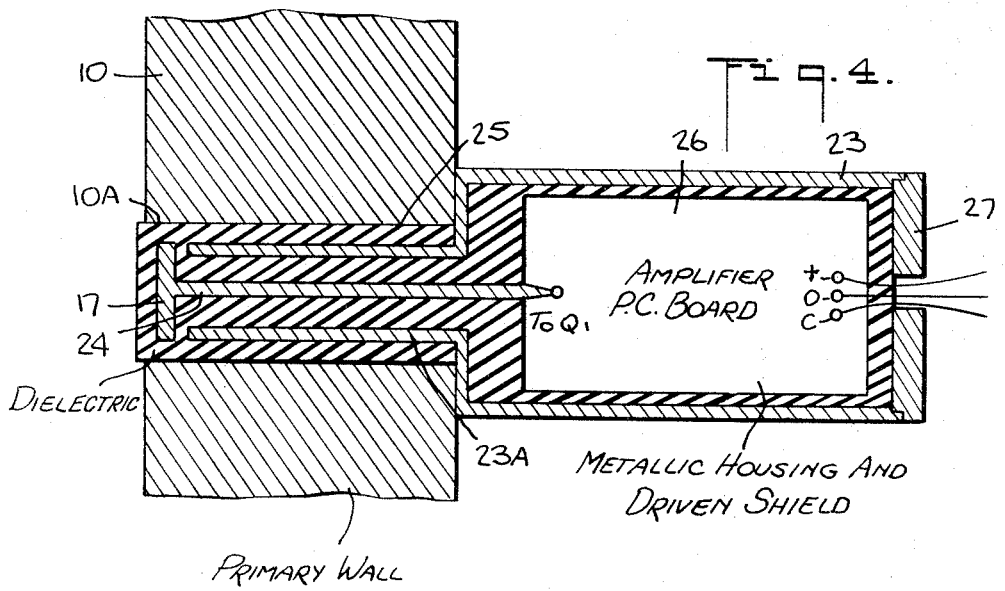
FIG. 4 is a sectional view of one of the electrode assemblies adapted to operate in conjunction with an unlined flow tube.
Figure 5:
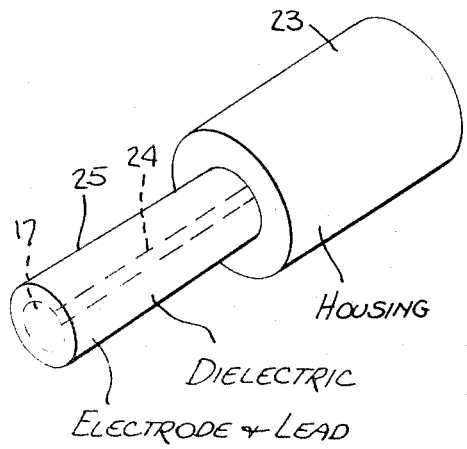
FIG. 5 is a perspective view of the electrode assembly shown in FIG. 4.

Referring now to FIGS. 4 and 5, there is shown a practical embodiment of an electrode assembly in accordance with the invention, which has been designed to replace a standard direct-contact electrode in a magnetic flowmeter whose unlined flow tube 10 has an opening 10A dimensioned to accommodate a metering electrode.

Inserted in opening 10A is the probe section of the electrode assembly, which section takes the form of a rod 25 of dielectric material. Since it is desirable that this material have a high dielectric constant to provide a coupling capacitor in the picofarad range, use is preferably made of barium titanate or other high dielectric-constant material having suitable structural properties, such as "Kynar."

Embedded in rod 25 at a position adjacent the face thereof, and in parallel relation thereto, is a disc-shaped metal electrode 17 of high conductivity. Electrode 17 in combination with the dielectric face layer and the electrode defined by the fluid passing through the tube, provides a capacitive coupling path for the A-C voltage induced in the fluid.

This voltage is applied by lead 24 extending between electrode 17 and the gate of field-effect transistor $Q_1$, to the amplifying system. Transistors $Q_1$ and $Q_2$ are supported on a printed-circuit board 26 providing the associated circuits. The transistors, the printed-circuit board, and the integrated-circuit amplifier chip 16 are embedded within a cylindrical metal housing which constitutes the electrostatic shield 23. The front end of housing 23 lies against the exterior wall of the flow tube 10, this front having a tubular extension 23A of reduced diameter which projects into probe 25 to surround and shield the electrode lead 24. Thus the only element of the assembly which is exposed is the metering electrode.

The output terminal "O" of the assembly, the positive voltage terminal "+", and the common terminal "C", are connected to cable wires which pass out of an opening in a closure 27.

Thus the electrode assembly, which incorporates the metering electrode and the associated amplifying system, is a self-sufficient unit and serves to generate a metering signal which is transmittable to a remote station for flow-measurement indications, and for control purposes. Though there is no direct contact with the fluid being measured, the assembly yields a signal which is substantially proportional to flow rate and remains so even when contaminants coat the exposed face of the assembly.

It is often the practice to provide the flow tube of electromagnetic flowmeters with insulating liners for protective or sanitary purposes, depending on the anticipated nature of the fluid to be measured. Such liners are fabricated of Teflon, neoprene, vitreous enamel or other suitable materials. In the conventional lined flow tube, the electrode extends through the liner to make contact with the fluid.

Figure 6:
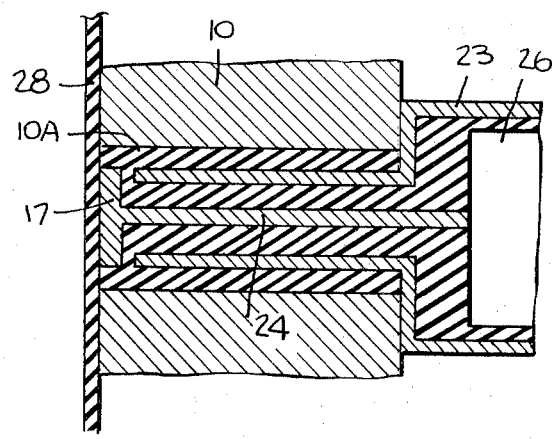
FIG. 6 is a sectional view of an electrode assembly adapted to operate with a lined flow tube.

In the present invention there is no direct contact between the metering electrode and the fluid being measured and the liner 28, as shown in FIG. 6, seals the opening 10A into which the metering probe is introduced. But in this instance, the head of electrode 17 lies against the portion of the liner which covers opening 10A, this portion serving as the dielectric of the capacitance whose electrodes are the fluid and metering electrode. The liner therefore is preferably made of a material having a high dielectric constant, such as Kynar, which permits the use of a relatively thick covering over the electrode.

Other liner materials, such as FEP TEFLON, could also be used, but these may necessitate a thinner liner to realize the desired value of capacitance. The arrangement in FIG. 6 is otherwise the same as that shown in FIG. 4. The advantage of a lined flow tube in which the electrode is behind the liner, as shown in FIG. 6, is that there are no protuberances, joints or seals in the electrode region which in sanitary use might be a source of contamination.

While there has been shown and described a preferred embodiment of a metering electrode assembly for electromagnetic flowmeters in accordance with the invention, it will be appreciated that many changes and modifications may be made therein without, however, departing from the essential spirit thereof.

We claim:

1. An electrode assembly for an electromagnetic flowmeter having a flow tube and means to establish an electromagnetic field across the tube whereby fluid conducted therethrough and intersecting this field induces an A-C voltage in metering electrodes disposed at diametrically- opposed positions on said tube; said assembly including a probe section insertable into an opening in the wall of the flow tube, one of said metering electrodes being disposed within said probe section, a thin layer of dielectric material having a high dielectric constant covering the face of said one electrode, said electrode being dimensioned to define with said dielectric layer and the fluid passing through said tube a coupling capacitance in the picofarad range providing a low-impedance path for said voltage, and means to connect said metering electrode to an amplifying system having a relatively high input impedance whose value is mainly represented by a capacitance that is a small fraction of a picofarad, whereby changes in the coupling impedance have substantially no effect on the output of said amplifying system.

2. An electrode assembly as set forth in claim 1, wherein said layer of dielectric material is defined by a portion of a liner of dielectric material covering the interior surface of said flow tube.

3. An assembly as set forth in claim 1, wherein said dielectric material is barium titanate.

4. An electrode assembly as set forth in claim 1, wherein said electrode is disc-shaped.

5. An electrode assembly for an electromagnetic flowmeter having a flow tube and means to establish an electromagnetic field across the tube whereby fluid conducted therethrough and intersecting the field induces an A-C signal in metering electrodes disposed at diametrically-opposed positions on said tube, said assembly comprising:

A. a probe section insertable into an opening in the wall of the flow tube and formed of dielectric material, having a high dielectric constant, one of said metering electrodes being disposed in said probe section in parallel relation to the face thereof, said face being flush with the inner surface of the tube, said one electrode and the layer of dielectric material interposed between the electrode and the face in combination with the electrode defined by the fluid constituting a coupling capacitance whose value lies in the picofarad range whereby said capacitance presents a relatively low impedance, and a lead connected at one end to said electrode and extending through said probe section, and B. an amplifying section integral with said probe section and projecting outwardly from the wall of the tube, the front end of said amplifying section lying against the outer surface of said tube, and an amplifying system disposed within said amplifying section and connected to the other end of said lead, said amplifying system having a relatively high input impedance represented mainly by a capacitance whose value is a small fraction of a picofarad whereby changes in said coupling impedance have substantially no effect on the output of said amplifying system.

6. An assembly as set forth in claim 5, wherein said amplifying section is housed in a metallic housing constituting an electrostatic shield, said housing having a tubular extension disposed in said probe section and surrounding said lead.

7. An assembly as set forth in claim 6, further including means connecting said amplifying system to said shield to drive same.

8. An assembly as set forth in claim 5, wherein said amplifying system includes an amplifier, a first field-effect transistor whose drain is coupled to the input of said amplifier, whose source is connected to the output of said amplifier through a feedback path, and whose gate is connected to said other end of said lead whereby said field-effect transistor presents a high-input impedance to said A-C signal.

9. An assembly as set forth in claim 8, wherein said amplifier is an integrated circuit.

10. An assembly as set forth in claim 9, further including a second field-effect transistor interposed between said first field-effect transistor and said amplifier to provide a bootstrapping effect.

11. An assembly as set forth in claim 10, further including a Zener diode connected between the source of said first transistor and the gate of the second transistor.

12. An assembly as set forth in claim 11, wherein the circuit including said transistors and said Zener diode is formed on a printed-circuit board.

* * * * *